United States Patent
Jung et al.

(10) Patent No.: US 9,036,492 B2
(45) Date of Patent: May 19, 2015

(54) APPARATUS AND METHOD FOR SCHEDULING IN WIRELESS COMMUNICATION SYSTEM

(75) Inventors: Dae-Kwon Jung, Suwon-si (KR); Tai-Suk Kim, Seoul (KR); Joo-Eung Kim, Seoul (KR); Eun-Ho Choi, Seoul (KR); Youngnam Han, Daejeon (KR); Jin-Yup Hwang, Daejeon (KR); Jinyoung Oh, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 136 days.

(21) Appl. No.: 13/277,992

(22) Filed: Oct. 20, 2011

(65) Prior Publication Data

US 2012/0099454 A1 Apr. 26, 2012

(30) Foreign Application Priority Data

Oct. 22, 2010 (KR) ........................ 10-2010-0103307

(51) Int. Cl.
H04L 12/26 (2006.01)
H04W 72/12 (2009.01)
H04L 5/00 (2006.01)

(52) U.S. Cl.
CPC ......... *H04W 72/1247* (2013.01); *H04L 5/0037* (2013.01)

(58) Field of Classification Search
CPC ....................................................... H04W 72/12
USPC .................................. 370/252, 328, 329, 335
See application file for complete search history.

(56) References Cited

U.S. PATENT DOCUMENTS

| | | | |
|---|---|---|---|
| 7,890,114 B2 * | 2/2011 | Braun et al. | 455/450 |
| 8,331,377 B2 * | 12/2012 | Attar et al. | 370/395.42 |
| 2009/0270103 A1 * | 10/2009 | Pani et al. | 455/436 |
| 2010/0111023 A1 * | 5/2010 | Pelletier et al. | 370/329 |
| 2012/0076090 A1 * | 3/2012 | Kim et al. | 370/329 |

* cited by examiner

*Primary Examiner* — Dang Ton
*Assistant Examiner* — Nourali Mansoury

(57) ABSTRACT

A scheduling method and apparatus in a wireless communication system. The scheduling method for a node B in a wireless communication system supporting a plurality of carriers includes determining a delay weight for each of a plurality of user equipment (UEs) according to a preset weight application time point. The method also includes determining a scheduling metric value of each UE per carrier using the delay weight, and determining a priority of each UE per carrier using the scheduling metric value.

20 Claims, 8 Drawing Sheets

|  | CURRENT PRIORITY UE | NEXT PRIORITY UE | ... |
|---|---|---|---|
| CARRIER 1 | UE4 | UE3 | ... |
| CARRIER 2 | UE4 | UE1 | ... |

FIG.7

APPARATUS AND METHOD FOR SCHEDULING IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Oct. 22, 2010, and assigned Serial No. 10-2010-0103307, the entire disclosure of which is hereby incorporated by reference.

TECHNICAL FIELD

The present disclosure relates generally to an apparatus and method for scheduling in a wireless communication system. More particularly, the present disclosure relates to a user scheduling method and apparatus in a dual-carrier High Speed Packet Access (HSPA) system.

BACKGROUND

A dual-carrier High Speed Packet Access (HSPA) system uses two adjacent carriers in the same band or two carriers in different bands. Compared to a single-carrier HSPA system, the dual-carrier HSPA system can double data transmission amount and smoothly provide a mass data traffic service and a real-time traffic service.

When the dual carrier is supported, frequency selectivity and multiuser diversity gain increase theoretically, compared to the single carrier supported. Accordingly, when users are optimally allocated to the dual carrier, load balancing for the dual carrier is achieved to thus accomplish more enhanced performance.

However, since the current dual-carrier HSPA system performs scheduling by considering only one frequency band as in the scheduling of the single-carrier HSPA, supporting the dual carrier may not be advantageous. For example, a dual carrier joint proportion fairness scheduling scheme is suggested as the scheduling method for the dual-carrier HSPA system. The joint proportion fairness scheduling determines a user priority for each carrier by expanding a Proportional Fairness (PF) scheduling scheme of the single-carrier HSPA system to the dual-carrier system, and thus can enhance the system performance compared to the single-carrier PF scheduling scheme.

Since the joint proportion fairness scheduling scheme determines the user's priority per carrier, the priority of one carrier does not affect the priority of the other carrier. However, the transmit data and the remaining resources depend on the carrier to which the user is first allocated in the actual environment. As a result, use of the dual carrier in such a manner may not be very advantageous.

SUMMARY

To address the above-discussed deficiencies of the prior art, it is a primary aspect of the present disclosure to provide a scheduling method and apparatus in a wireless communication system using a dual carrier.

Another aspect of the present disclosure is to provide a method and an apparatus for determining a user priority per carrier in a wireless communication system using a dual carrier.

Yet another aspect of the present disclosure is to provide a method and an apparatus for determining a maximum allowable delay time per user and a delay weight corresponding to a packet delay time according to a weight application time point for each user data in a wireless communication system using a dual carrier.

Still another aspect of the present disclosure is to provide a method and an apparatus for determining a user priority using a scheduling metric value reflecting a user delay weight per carrier in a wireless communication system using a dual carrier.

A further aspect of the present disclosure is to provide a method and an apparatus for determining a user priority per carrier and determining a carrier for a user having the same priority in two carriers in a wireless communication system using a dual carrier.

A further aspect of the present disclosure is to provide a method and an apparatus for determining a carrier for each user and then determining a priority of corresponding users per carrier in a wireless communication system using a dual carrier.

According to one aspect of the present disclosure, a scheduling method of a node B in a wireless communication system supporting a plurality of carriers is provided. The method includes determining a delay weight for each of a plurality of User Equipments (UEs) according to a preset weight application time point. The method also includes determining a scheduling metric value of each UE per carrier using the delay weight, and determining a priority of each UE per carrier using the scheduling metric value.

According to another aspect of the present disclosure, a scheduling apparatus of a node B in a wireless communication system supporting a plurality of carriers is provided. The apparatus includes a scheduler configured to determine a delay weight for each of a plurality of UEs according to a preset weight application time point, determine a scheduling metric value of each UE per carrier using the delay weight, and determining a priority of each UE per carrier using the scheduling metric value.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates a user having the same priority in two carriers in the dual-carrier wireless communication system according to an embodiment of the present disclosure.

Throughout the drawings, like reference numerals will be understood to refer to like parts, components and structures.

DETAILED DESCRIPTION

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments in the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a scheduling method and apparatus in a dual-carrier wireless communication system. Hereinafter, the present disclosure is equally applicable to the scheduling in a wireless communication system using a plurality of carriers.

In the dual-carrier wireless communication system, user scheduling is carried out such that a node B determines a delay weight for each user and determines a user priority per carrier using a scheduling metric value per user reflecting the delay weight.

Figure 1A:
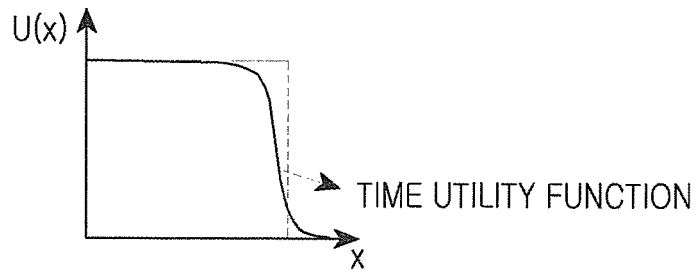
FIG. 1A illustrates packet delay characteristics in a real-time traffic service.
Figure 1B:
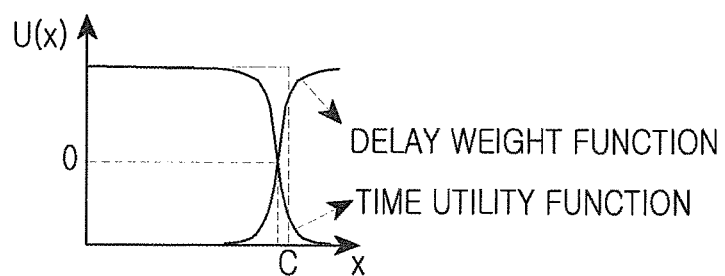
FIG. 1B illustrates a relationship between the packet delay characteristics and a weight.
Figure 1C:
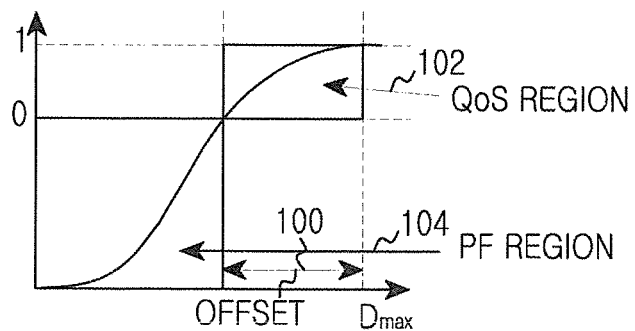
FIG. 1C illustrates weight applied in a dual-carrier wireless communication system according to an embodiment of the present disclosure.

Now, a present scheduling method is explained in brief by referring to FIGS. 1A, 1B and 1C.

Referring first to FIG. 1A, when a real-time traffic service transmits a packet within a certain time, high utility of the corresponding packet can be maintained. By contrast, when the packet is not transmitted within the certain time, the utility of the corresponding packet gradually decreases. When the packet is not transmitted within a maximum allowable delay time, the utility of the corresponding packet becomes zero and thus the packet is discarded.

Hence, the real-time traffic service can raise the probability of transmitting the corresponding packet within the maximum allowable delay time by allocating a high delay weight to the delayed packets as much as the time close to the maximum allowable delay time. That is, the delay weight for each packet can be determined in inverse proportion to the packet delay characteristic as shown in FIG. 1B. In so doing, the delay weight for each packet can be given by Equation 1.

Equation 1 defines the delay weight for each user data.

$$\gamma_i(d_i) = \frac{\alpha_i(d_i - (D_i^{max} - d_{i,off}))}{\sqrt{1 + \beta_i \cdot (d_i - (D_i^{max} - d_{i,off}))^2}} \quad [\text{Eqn. 1}]$$

In Equation 1, $\gamma_i(d_i)$ denotes the delay weight of the packet for the user i, $D_i^{max}$ denotes the maximum allowable delay time for the packet of the user 1, $d_i$ denotes the packet delay time of the user i, and $\alpha_i$ and $\beta_i$ denote the weight value changed according to traffic type. Herein, $\alpha_i$ and $\beta_i$ can be set and changed by a provider or a designer. $d_{i,off}$ is an offset for the maximum allowable delay time and denotes a time period actually applying the delay weight to the packet. Herein, $d_{i,off}$ can be represented as $\delta \cdot D_i^{max}$ and $\delta$ can be set to a value between 0 and 1. Thus, $d_{i,off}$ can be changed by controlling $\delta$, and $d_{i,off}$ is set and changed by the provider or the designer.

That is, the delay weight is set to a negative value with respect the packet delayed by the time smaller than the offset 100 indicating $d_{i,off}$, and to a value between 0 and 1 with respect to the packet delayed by the time corresponding to the offset 100 as shown in FIG. 1C. The intended traffic quality can be ensured by changing the offset 100 and altering the delay weight to apply according to the packet delay time. Herein, when the offset 100 is lengthened, the real-time traffic service of higher quality can be ensured by applying the delay weight to the packet delayed for a short time. When the offset 100 is shortened, the real-time traffic service of higher quality can be ensured by applying the delay weight only to the packets delayed for a long time.

As such, embodiments of the present disclosure allow the packet delay within the range where the packet delay time does not exceed the maximum allowable delay time, and can determine the delay weight value according to the current packet delay time based on the offset 100.

Also, embodiments of the present disclosure can determine a priority of the user per carrier using the delay weight. The priority of the user can be given by Equation 2.

Equation 2 determines the priority of the user using a scheduling metric value reflecting the delay weight.

$$i^* = \operatorname*{argmax}_{i}(1 + \gamma(d_i)) \left( \frac{\sum_{k=1}^{k_j(t)} x_{i,j,k} r_{i,j,k(t)}}{(t_C - 1)R_i(t)} \right) \quad [\text{Eqn. 2}]$$

In Equation 2, i denotes the user, j denotes a carrier, and k denotes a code. x denotes an allocation index, r(t) denotes an achievable data rate, $t_c$ denote a window size, and R(t) denotes an average data rate. That is, $(t_c-1)R_i(t)$ denotes an average data rate for the user i, and $$\sum_{i=1}^{k_j(t)} x_{i,j,k} r_{i,j,k(t)}$$

denotes a current data rate for the user i.

Hereafter, $$(1 + \gamma(d_i)) \left( \frac{\sum_{i=1}^{k_j(t)} x_{i,j,k} r_{i,j,k(t)}}{(t_C - 1)R_i(t)} \right)$$

is referred to as a scheduling metric value for the carrier j of the user i.

As expressed in Equation 2, embodiments of the present disclosure can give the high priority by determining the user having the greatest scheduling metric value per carrier, allocate the next priority by determining the user having the greatest scheduling metric value with respect to the other users excluding the user, and thus determine the user priority.

As stated above, embodiments of the present disclosure schedule by determining the delay weight for each user based on Equation 1 and determining the user priority per carrier based on Equation 2. When the user priority is determined per carrier, a user may be given the same priority in two carriers. In this situation, the carrier through which the user is scheduled can affect the performance of the whole system.

Hence, when the user priority is determined based on Equation 1 and Equation 2, the present disclosure provides two scheduling methods according to how to determine the carrier for delivering the user data.

One scheduling method determines the user priority per carrier, and then, when the user is given the same priority in two carriers, determines one carrier using the scheduling metric of the corresponding user or the scheduling metric value of the user of the next priority. The other scheduling method determines the carrier for each user and then determines the priority of the corresponding users per carrier.

Now, structure and operations of a node B for scheduling based on the above are explained in detail by referring to the drawings.

Figure 2:
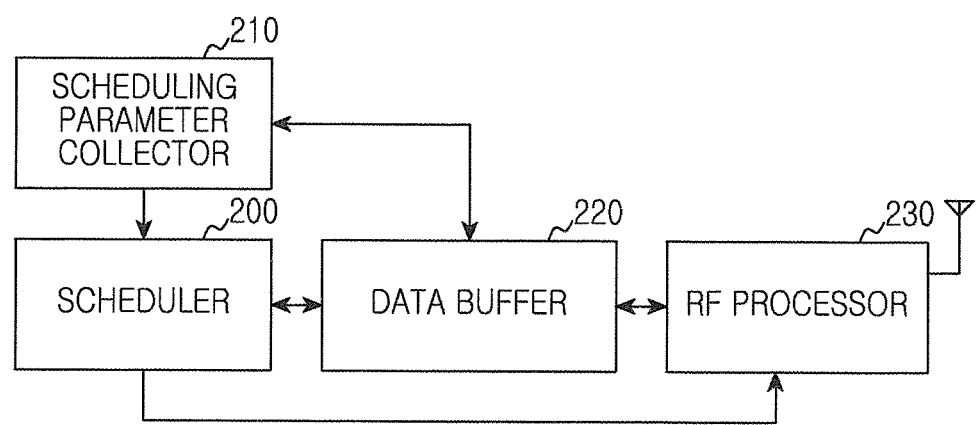
FIG. 2 illustrates a node B in the dual-carrier wireless communication system according to an embodiment of the present disclosure.

FIG. 2 is a block diagram of the node B in the dual-carrier wireless communication system according to an embodiment of the present disclosure.

Referring to FIG. 2, the node B includes a scheduler 200, a scheduling parameter collector 210, a data buffer 220, and a Radio Frequency (RF) processor 230.

The scheduler 200 schedules to transmit data stored to the data buffer 220 to the corresponding User Equipment (UE). That is, the scheduler 200 allocates to the corresponding UE the radio resource to be used to transmit the data stored to the data buffer 220. In one embodiment, the scheduler 200 determines the delay weight for the data of the corresponding user based on the delay time and the maximum allowable delay time for each user data stored to the data buffer 220 based on Equation 1, determines the priority of the users based on the scheduling metric value reflecting the delay weight of the users per carrier based on Equation 2, and thus allocates the resources to the UEs according to the priority.

Herein, the scheduler 200 determines which one of the dual carriers supported by the node B is used to allocate the resource to the UE. In so doing, after determining the user priority, when the user is given the same priority in two carriers, the scheduler 200 can determine the carrier using the scheduling metric of the corresponding user or the scheduling metric value of the next priority user. After determining the carrier for each user, the scheduler 200 can determine the priority of the user with respect to the users who determine the corresponding carrier per carrier.

Figure 3:
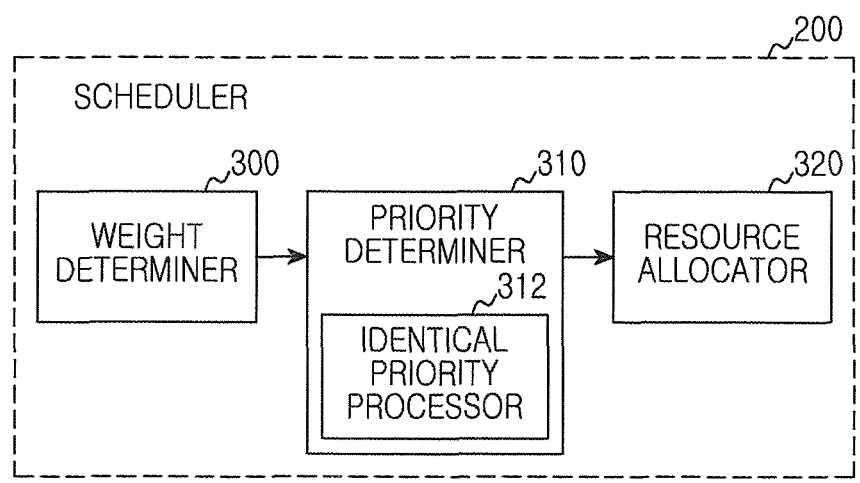
FIG. 3 illustrates a scheduler in the dual-carrier wireless communication system according to an embodiment of the present disclosure.
Figure 4:
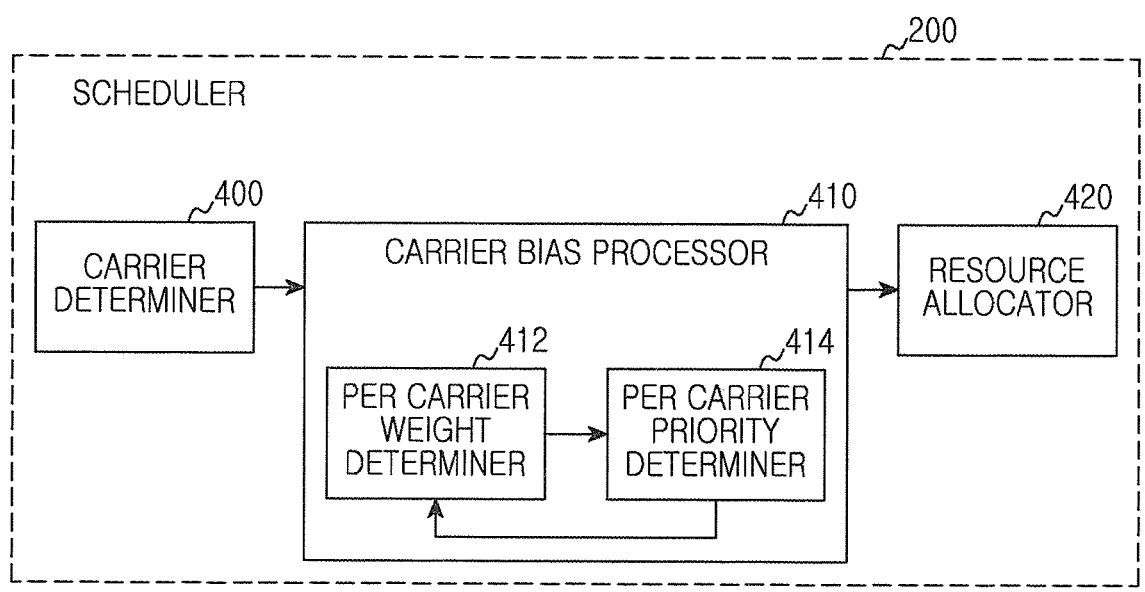
FIG. 4 illustrates a scheduler in the dual-carrier wireless communication system according to another embodiment of the present disclosure.

Herein, how the scheduler 200 determines the carrier for each UE shall be described by referring to FIGS. 3 and 4.

The scheduling parameter collector 210 receives channel quality information fed back from the UE, provides the received channel quality information to the scheduler 200, collects and determines parameters used to determine the delay weight and the priority, and provides the parameters to the scheduler 200. For example, the scheduling parameter collector 210 collects or determines the information of the delay time for the user data, the maximum allowable delay time, the weights $\alpha_i$ and $\beta_i$ changed according to the traffic type, the offset $d_{i,off}$ for the maximum allowable delay time, the achievable data rate r(t), the window size $t_c$, and the average data rate R(t), and provides them to the scheduler 200.

The data buffer 220 stores data to transmit to the UEs. The data stored to the data buffer 220 are output to the RF processor 230 for the transmission through the scheduling of the scheduler 200.

The RF processor 230 processes the data output from the data buffer 220 in a predefined fashion and transmits the processed data over an antenna. The RF processor 230 processes to transmit the data output from the data buffer 220 through the carrier scheduled by the scheduler 200.

FIG. 3 is a detailed block diagram of the scheduler in the dual-carrier wireless communication system according to an embodiment of the present disclosure.

Referring to FIG. 3, the scheduler 200 includes a weight determiner 300, a priority determiner 310, and a resource allocator 320. The priority determiner 310 includes an identical priority processor 312.

The weight determiner 300 determines the delay weight of the data for the corresponding user based on Equation 1 with the delay time and the maximum allowable delay time for the user data stored to the data buffer 220, and provides the determined delay weight to the priority determiner 310.

The priority determiner 310 calculates the scheduling metric value per user reflecting the delay weight for the dual carrier, and determines the user priority for the dual carrier by comparing the scheduling metric value per user. In other words, the priority determiner 310 determines the user priority for the first carrier by comparing the scheduling metric values of the users for the first carrier, and determines the user priority for the second carrier by comparing the scheduling metric values of the users for the second carrier.

The priority determiner 310 determines whether there is a user having the same priority in the first carrier and the second carrier, through the identical priority processor 312. That is, when a user has the same priority in the first carrier and the second carrier, the identical priority processor 312 compares the scheduling metric value of the first carrier and the scheduling metric value of the second carrier of the corresponding user and thus determines the carrier of the greater scheduling metric value. When the scheduling metric value of the first carrier of the corresponding user is equal to the scheduling metric value of the second carrier, the identical priority processor 312 determines the carrier for the corresponding user by considering the next-priority user of the carriers. That is, since the carrier used by the user having the same priority in the two carriers affects the next priority users of the two carriers, the identical priority processor 312 can compare the sum of the scheduling metric values of the next priority users according to the carrier used by the corresponding user and thus determine the carrier of the greater scheduling metric value sum. For example, it is assumed that the UE4 has the same priority in the first carrier and the second carrier, the UE3 has the next priority in the first carrier, and the UE1 has the next priority in the second carrier as shown in FIG. 7. In this situation, the identical priority processor 312 compares the scheduling metric value of the first carrier and the scheduling metric value of the second carrier of the UE4. When the scheduling metric value of the first carrier is greater than the scheduling metric value of the second carrier in the UE4 according to the comparison, the identical priority processor 312 determines the first carrier as the carrier of the UE4. By contrast, when the scheduling metric value of the first carrier is equal to the scheduling metric value of the second carrier in the UE4, the identical priority processor 312 calculates the sum of the scheduling metric values of the UE3 and the UE1 when the UE4 determines the first carrier, calculates the sum of the scheduling metric values of the UE3 and the UE1 when the UE4 determines the second carrier, and determines the carrier of the greater scheduling metric value sum as the carrier of the UE4.

Next, the priority determiner 310 provides the determined priority of each UE per carrier to the resource allocator 320.

Based on the priority determined by the priority determiner 310, the resource allocator 320 allocates the resource per carrier for transmitting the data of the corresponding UE.

FIG. 4 is a detailed block diagram of the scheduler in the dual-carrier wireless communication system according to another embodiment of the present disclosure.

Referring to FIG. 4, the scheduler 200 includes a carrier determiner 400, a carrier bias processor 410, and a resource allocator 420. The carrier bias processor 410 includes a per carrier weight determiner 412 and a per carrier priority determiner 414.

The carrier determiner 400 determines the carrier for each UE to be scheduled. In so doing, the carrier determiner 400 determines the carrier of each user using Channel Quality Indicator (CQI) information of the UE provided from the scheduling parameter collector 210. For example, the carrier determiner 400 compares the CQI of the first carrier and the CQI of the second carrier of a particular UE and thus determines the carrier associated with the greater CQI as the carrier of the particular UE.

The carrier bias processor 410 determines the weight and the priority of the corresponding UE per carrier according to the carrier determination of the carrier determiner 400 for each UE.

More specifically, the carrier bias processor 410 determines which one of the dual carriers the UE is biased to according to the carrier determination of the carrier determiner 400 for each UE. Herein, when a ratio of the UEs to schedule to the UEs determining one carrier is greater than a preset threshold, the carrier bias processor 410 can determine that the UE is biased to one carrier.

When the UE is not biased to either carrier, the carrier bias processor 410 calculates the weight of the corresponding UEs per carrier and then determines the priority through the per carrier weight determiner 412 and the per carrier priority determiner 414. In so doing, the per carrier weight determiner 412 and the per carrier priority determiner 414 can determine the weight and the priority of the UEs corresponding to the carriers based on Equation 1 and Equation 2.

By contrast, when UE is biased to either carrier, the carrier bias processor 410 calculates the weight and the priority of the corresponding UEs for the biased carrier through the per carrier weight determiner 412 and the per carrier priority determiner 414, and then allocates the corresponding UEs to the biased carrier based on the priority. Next, the carrier bias processor 410 determines the weight and the priority for the carrier through the per carrier weight determiner 412 and the per carrier priority determiner 414 by considering all of the remaining UEs which determine the biased carrier but are not allocated to the biased carrier, the UEs which are allocated to the biased carrier but still have data to transmit, and the UEs which determine the other carrier, and allocates all of the considered UEs to the other carrier based on the priority.

Next, the carrier bias processor 410 provides the resource allocator 420 with the priority of the UEs determined per carrier.

Based on the priority determined by the per carrier priority determiner 414, the resource allocator 420 allocates the resource per carrier for transmitting the data of the corresponding UE.

Figure 5:
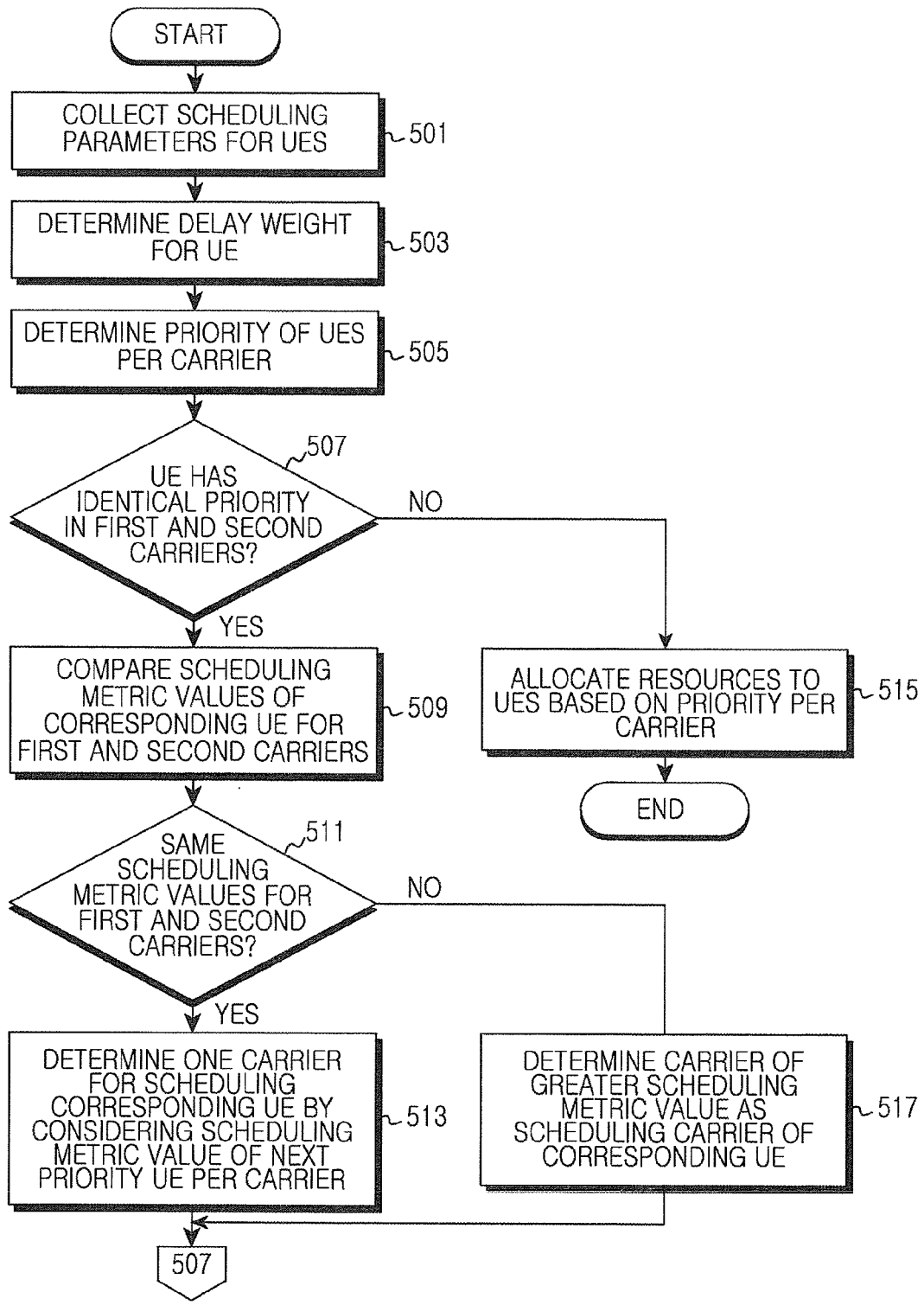
FIG. 5 illustrates a scheduling method of the node B in the dual-carrier wireless communication system according to an embodiment of the present disclosure.

FIG. 5 illustrates a scheduling method of the node B in the dual-carrier wireless communication system according to an embodiment of the present disclosure.

Referring to FIG. 5, the node B collects the scheduling parameters for each UE in step 501. That is, the node B collects the parameters used to determine the delay weight and the priority for each UE. For example, the node B can collect the information of the delay time for the user data, the maximum allowable delay time, the weights $\alpha_i$ and $\beta_i$ changed according to the traffic type, the offset $d_{i,off}$ for the maximum allowable delay time, the achievable data rate r(t), the window size $t_c$, and the average data rate R(t).

The node B determines the delay weight for each UE in step 503, and determines the priority of the UEs per carrier by calculating the scheduling metric of the UE reflecting the delay weight per carrier in step 505. The node B determines the delay weight for each UE based on Equation 1, and determines the priority of the UEs based on Equation 2.

In step 507, the node B determines whether there is a UE having the same priority in the first and second carriers.

When there is no UE having the same priority in the first and second carriers, the node B allocates the resource to each UE based on the priority per carrier in step 515 and finishes this process.

By contrast, when a UE has the same priority in the first and second carriers, the node B compares the scheduling metric value for the first carrier and the scheduling metric value for the second carrier of the corresponding UE in step 509, and then determines whether the scheduling metric values for the two carriers are equal in step 511.

When the scheduling metric values of the corresponding UE for the two carriers are not equal, the node B determines the carrier of the greater scheduling metric value as the carrier for scheduling the corresponding UE in step 517 and returns to step 507.

By contrast, when the scheduling metric values of the corresponding UE for the two carriers are equal, the node B determines the carrier for scheduling the corresponding UE by taking account of the scheduling metric value of the next-priority UE per carrier in step 513. For example, it is assumed that the UE4 has the same priority in the first carrier and the second carrier, the UE3 has the next priority in the first carrier, and the UE1 has the next priority in the second carrier as shown in FIG. 7. In this situation, when the scheduling metric value of the first carrier is equal to the scheduling metric value of the second carrier in the UE4, the node B compares the sum of the scheduling metric values of the UE3 and the UE1 when the UE4 determines the first carrier, and the sum of the scheduling metric values of the UE3 and the UE1 when the UE4 determines the second carrier, and thus determines the carrier of the greater scheduling metric value sum as the carrier of the UE4.

Next, the node B goes back to step 507.

Figure 6:
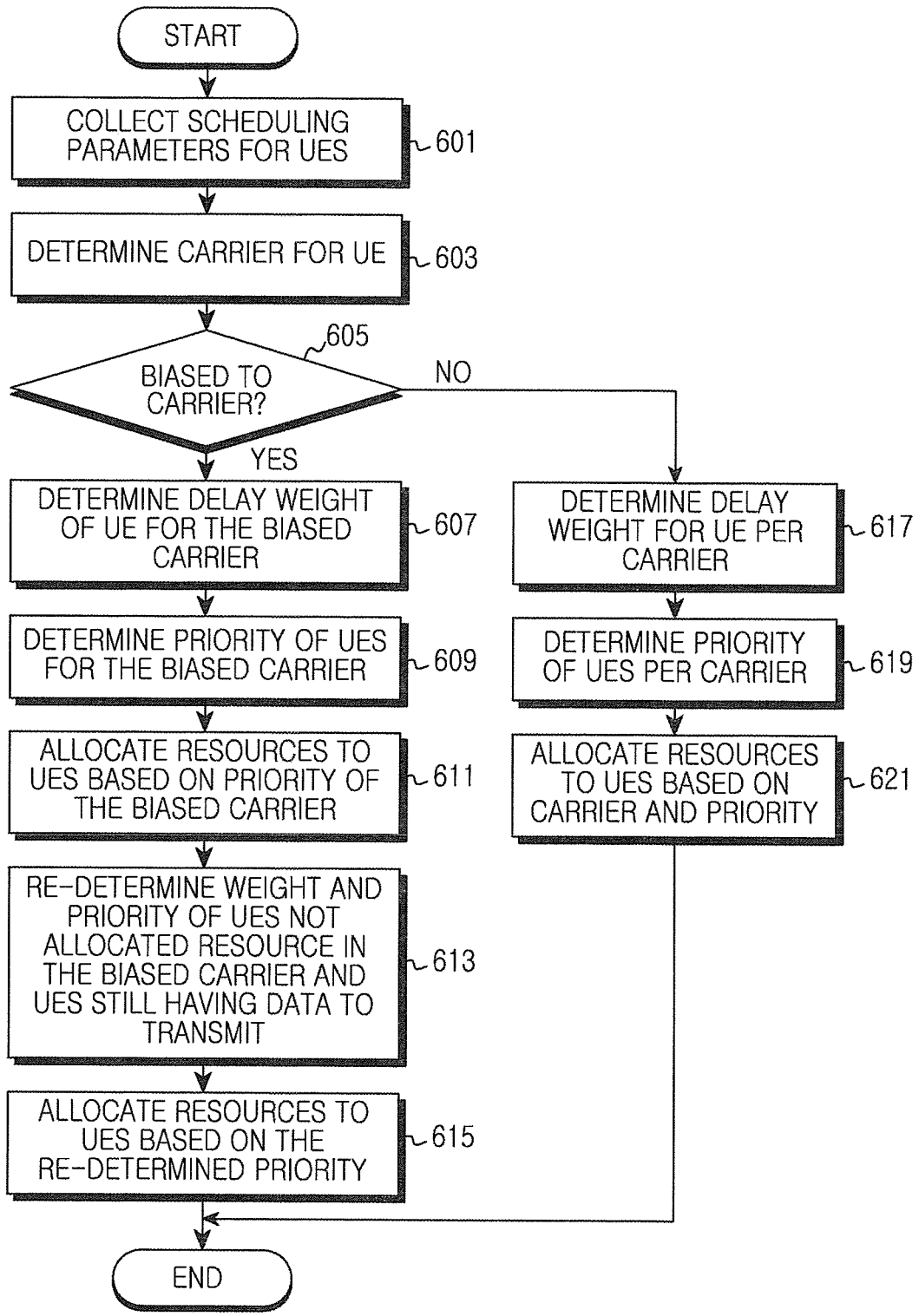
FIG. 6 illustrates a scheduling method of the node B in the dual-carrier wireless communication system according to another embodiment of the present disclosure.

FIG. 6 illustrates a scheduling method of the node B in the dual-carrier wireless communication system according to another embodiment of the present disclosure.

Referring to FIG. 6, the node B collects the scheduling parameters for each UE in step 601. That is, the node B collects the parameters used to determine the delay weight and the priority for each UE. For example, the node B can collect the information of the delay time for the user data, the maximum allowable delay time, the weights $\alpha_i$ and $\beta_i$ changed according to the traffic type, the offset $d_{t,off}$ for the maximum allowable delay time, the achievable data rate r(t), the window size $t_c$, and the average data rate R(t). Also, the node B collects the CQI information fed back from the UEs.

In step 603, the node B determines the carrier for each UE. The node B can determine the carrier of the greater CQI value as the carrier of the corresponding UE based on the CQI information per carrier fed back from the UEs.

In step 605, according to the carrier determination for each UE, the node B determines whether the UEs are biased to one of the dual carriers. That is, the node B can determine that the UE is biased to one carrier when the ratio of the UEs to schedule to the UEs determining the one carrier is greater than a preset threshold.

When the UE is not biased to one carrier, the node B determines the weight of the corresponding UEs per carrier in step 617, and then determines the priority of the corresponding UEs per carrier in step 619. In so doing, the node B can determine the weight and the priority of the UEs corresponding to each carrier based on Equation 1 and Equation 2.

The node B allocates the resource to each UE according to the determined priority per carrier in step 621 and finishes this process.

By contrast, when the UE is biased to one carrier, the node B determines the weight of the corresponding UEs for the biased carrier in step 607, determines the priority of the corresponding UEs for the biased carrier in step 609, and then allocates the corresponding UEs to the biased carrier based on the priority in step 611.

In step 613, the node B re-determines the weight and the priority for the other carrier by considering all of the remaining UEs which determine the biased carrier but are not allocated to the biased carrier, the UEs which are allocated to the biased carrier but still have data to transmit, and the UEs which determine the other carrier.

Next, the node B allocates all of the considered UEs to the other carrier based on the re-determined priority in step 615 and finishes this process.

Figure 8:
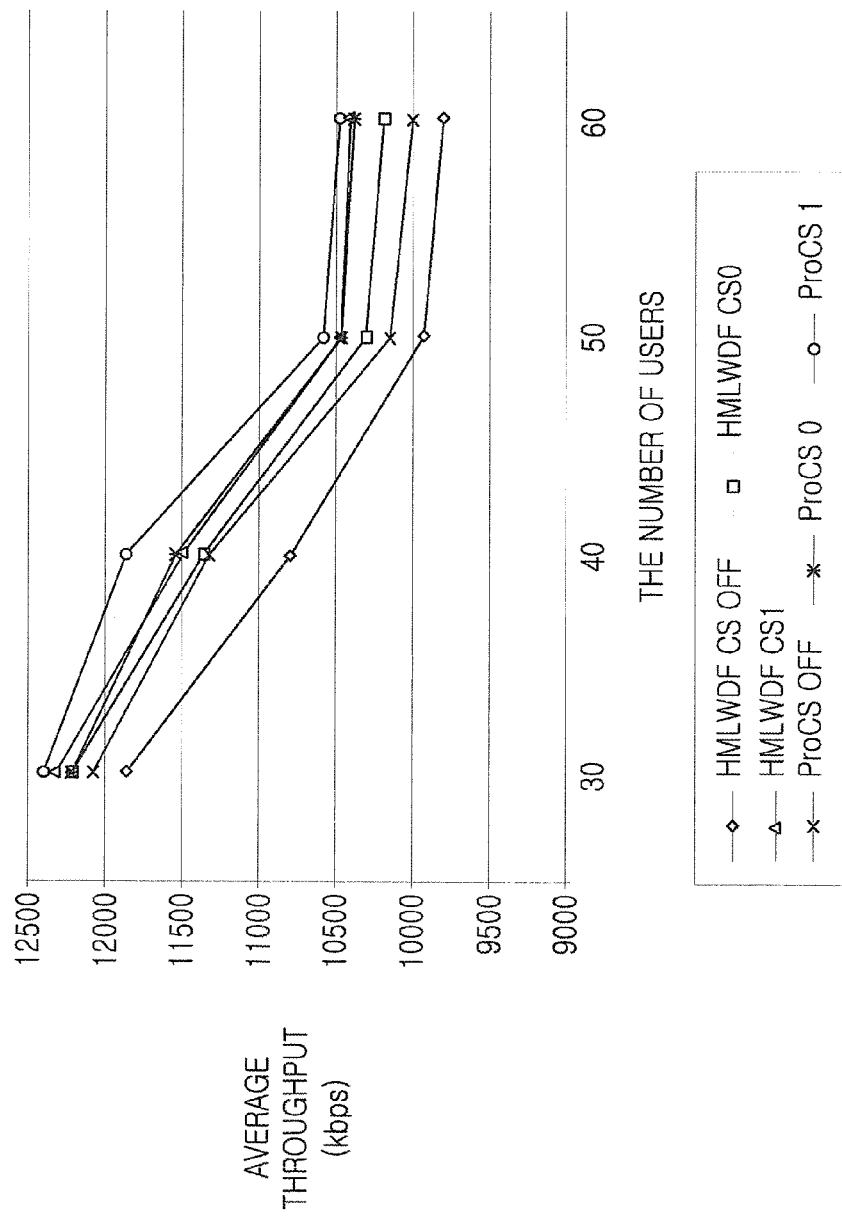
FIG. 8 illustrates a scheduling performance graph of a conventional method and the present disclosure.

FIG. 8 is a scheduling performance graph of a conventional method and embodiments of the present disclosure. Herein, the horizontal axis indicates the number of UEs, and the vertical axis an average throughput. HMLWDF, which is a hierarchical MLWDF scheme typically used for the scheduling in the mixed traffic environment, first allocates the real-time traffic user and then allocates a non-real-time traffic user when the resource remains. Pro denotes the present scheduling method. CS OFF randomly determines the carrier when the user has the same priority in the dual carrier, CS 0 determines the carrier according to one embodiment of the present disclosure when the user has the same priority, and CS 1 first determines the carrier and then determines the user priority according to another embodiment of the present disclosure.

As shown in FIG. 8, since the HMLWDF method first allocates the real-time traffic user unconditionally, its average throughput is lower than the present method. That is, the present method sets the offset for the maximum allowable delay time, first allocates the traffic only when the packet delay time of the real-time traffic lies within the offset, and gives the transmission opportunity to the non-real-time traffic user in other cases. Thus, when the user's channel condition is hospitable, the present disclosure can increase the whole average throughput by increasing the opportunity of the packet transmission, and enhance the fairness. Even when the conventional HMLWDF method is used, the carrier determination (HMLWDF CS 0, HMLWDF CS 1) achieves higher average throughput than the random carrier determination (HMLWDF CS OFF), according to the present method.

The present disclosure can reduce the complexity compared to the conventional scheduling method, by determining the priority of the UE per carrier based on Equation 1 and Equation 2 and applying the two methods to determine the carrier for each UE. That is, when the conventional scheduling method schedules the UEs, the UEs are compared for $2N*\log(N)+2^N$. The present scheduling method compares the UEs for $2N*\log(N)+N+2k'$ or $N+a*\log(a)+(N-b)*\log(N-b)$ and thus reduces the scheduling complexity.

In the dual-carrier wireless communication system, the maximum allowable delay time per user and the delay weight corresponding to the packet delay time are determined according to the weight application time point, and the user priority is determined for the respective carriers using the scheduling metric value per user reflecting the delay weight. Therefore, it is possible to ensure the real-time traffic service quality, to ensure the fairness for the data traffic service, and to enhance the system throughput by maximizing the gain in the dual-carrier use.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A scheduling method for a node B in a wireless communication system supporting a plurality of carriers, the method comprising:

determining a delay weight for each of a plurality of user equipments (UEs) according to a preset weight application time point;

determining a scheduling metric value of each UE per carrier of the plurality of carriers using the delay weight; and determining a priority of the each UE per carrier using the scheduling metric value, wherein the determining of the priority of the each UE per carrier comprises:

determining the priority of the UEs for each of a plurality of carriers by comparing the scheduling metric value of the each UE for each carrier; and determining a scheduling carrier of the each UE based on whether there is a UE having a same priority in two or more carriers.

2. The scheduling method of claim 1, wherein the determining of the delay weight for each UE comprises:

determining a maximum allowable delay time and a current delay time for each UE; and determining the delay weight for a UE of which the current delay time is after the preset weight application time point and smaller than the maximum allowable delay time.

3. The scheduling method of claim 1, wherein the scheduling metric value of each UE is determined using one or more of a delay weight of a corresponding UE, a current transmittable data rate for the corresponding UE, and an average data rate for the corresponding UE.

4. The scheduling method of claim 1, wherein the determining of the scheduling carrier of the each UE comprises:

determining whether there is the UE having the same priority in the two or more carriers; and when a first UE has the same priority, comparing scheduling metric values of the first UE for each of the two or more carriers; and determining the carrier with a greatest scheduling metric value as a scheduling carrier of the first UE.

5. The scheduling method of claim 4, further comprising:

when the scheduling metric values of the first UE are equal in the two or more carriers, comparing scheduling metric values of a next priority UE when the first UE determines one of the two or more carriers as a scheduling carrier; and determining the scheduling carrier when the scheduling metric value of the next priority UE is greatest, as the scheduling carrier of the first UE.

6. The scheduling method of claim 1, wherein the determining of the priority of the each UE per carrier comprises:

collecting channel quality information of each UE with respect to the plurality of carriers; and determining the scheduling carrier of each UE using the collected channel quality information.

7. The scheduling method of claim 6, wherein the determining of the scheduling carrier of each UE comprises:

comparing the channel quality information of each UE with respect to the plurality of carriers; and determining the carrier with a greatest channel quality information as the scheduling carrier.

8. The scheduling method of claim 6, wherein the determining of the priority of each UE comprises:

determining whether the number of UEs which determine one of the plurality of the carriers as the scheduling carrier, is greater than a preset threshold; and when the number of the UEs which determine one of the carriers as the scheduling carrier is smaller than the preset threshold, determining the priority of a corresponding UE with respect to the plurality of the carriers.

9. The scheduling method of claim 8, further comprising:

when the number of the UEs which determine the one carrier as the scheduling carrier is greater than the preset threshold, determining the priority of the UEs determining the one carrier;

allocating the UEs determining the one carrier, to the one carrier according to the priority;

re-determining a priority for another carrier by considering one or more of: a UE which determines the one carrier but is not allocated the one carrier, a UE which is allocated to the one carrier but still has data to transmit, and a UE which determines the other carrier; and allocating the one or more UEs considered to the other carrier according to the re-determined priority.

10. The scheduling method of claim 1, wherein a highest priority is given to the UE with the greatest scheduling metric value.

11. A scheduling apparatus of a node B in a wireless communication system supporting a plurality of carriers, comprising:

a scheduler configured to determine a delay weight for each of a plurality of user equipments (UEs) according to a preset weight application time point, determine a scheduling metric value of each UE per carrier using the delay weight, and determine a priority of the each UE per carrier using the scheduling metric value, wherein the scheduler determines the priority of the UEs for each of a plurality of carriers by comparing scheduling metric values of the each UE per each carrier of the plurality of carriers, and determines a scheduling carrier of the each UE based on whether there is a UE having a same priority in two or more carriers.

12. The scheduling apparatus of claim 11, wherein the scheduler comprises:

a weight determiner configured to determine a maximum allowable delay time and a current delay time for each UE, and determine the delay weight for a UE of which the current delay time is after the preset weight application time point and smaller than the maximum allowable delay time.

13. The scheduling apparatus of claim 11, wherein the scheduling metric value of each UE is determined using one or more of a delay weight of a corresponding UE, a current transmittable data rate for the corresponding UE, and an average data rate for the corresponding UE.

14. The scheduling apparatus of claim 11, wherein the scheduler determines whether there is the UE having the same priority in the two or more carriers, compares scheduling metric values of a first UE for each of the two or more carriers when the first UE has the same priority, and determines the carrier with a greatest scheduling metric value as a scheduling carrier of the first UE.

15. The scheduling apparatus of claim 14, wherein, when the scheduling metric values of the first UE are equal in the two or more carriers, the scheduler compares scheduling metric values of a next priority UE when the first UE determines one of the two or more carriers as a scheduling carrier, and determines the scheduling carrier when the scheduling metric value of the next priority UE is greatest, as the scheduling carrier of the first UE.

16. The scheduling apparatus of claim 11, wherein the scheduler determines the scheduling carrier of each UE using channel quality information of each UE with respect to the plurality of carriers.

17. The scheduling apparatus of claim 16, wherein the scheduler comprises:
   a carrier determiner configured to compare the channel quality information of each UE with respect to the plurality of carriers and determine the carrier with a greatest channel quality information as the scheduling carrier.

18. The scheduling apparatus of claim 16, wherein the scheduler determines whether the number of UEs which determine one of the plurality of the carriers as the scheduling carrier, is greater than a preset threshold, and determines a priority of a corresponding UE with respect to the plurality of the carriers when the number of the UEs which determine one carrier as the scheduling carrier is smaller than the preset threshold.

19. The scheduling apparatus of claim 18, wherein, when the number of the UEs which determine the one carrier as the scheduling carrier is greater than the preset threshold, the scheduler determines the priority of the UEs determining the one carrier, allocates the UEs determining the one carrier to the one carrier according to the priority, re-determines the priority for another carrier by considering one or more of: a UE which determines the one carrier but is not allocated the one carrier, a UE which is allocated to the one carrier but still has data to transmit, and a UE which determines the other carrier, and allocates the one or more of the UEs considered to the other carrier according to the re-determined priority.

20. The scheduling apparatus of claim 11, wherein a highest priority is given to the UE with the greatest scheduling metric value.

* * * * *